(12) United States Patent
Nealis et al.

(10) Patent No.: US 11,416,736 B2
(45) Date of Patent: Aug. 16, 2022

(54) DENSE DIGITAL ARITHMETIC CIRCUITRY UTILIZATION FOR FIXED-POINT MACHINE LEARNING

(71) Applicant: Intel Corporation, Santa Clara, CA (US)

(72) Inventors: Kevin Nealis, San Jose, CA (US); Randy Huang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1045 days.

(21) Appl. No.: 15/855,604

(22) Filed: Dec. 27, 2017

(65) Prior Publication Data
US 2018/0307975 A1    Oct. 25, 2018

Related U.S. Application Data

(60) Provisional application No. 62/488,636, filed on Apr. 21, 2017.

(51) Int. Cl.
| | | |
|---|---|---|
| *G06F 7/523* | (2006.01) | |
| *G06F 7/544* | (2006.01) | |
| *G06N 3/063* | (2006.01) | |

(52) U.S. Cl.
CPC .......... *G06N 3/063* (2013.01); *G06F 7/523* (2013.01); *G06F 7/5443* (2013.01); *G06F 2207/3828* (2013.01); *G06F 2207/4824* (2013.01)

(58) Field of Classification Search
CPC ..... G06F 2207/4824; G06F 2207/3828; G06F 7/487; G06F 7/4876; G06F 7/523; G06F 7/5443; G06F 17/15; G06F 17/153; G06F 17/16; G06N 3/06; G06N 3/063
See application file for complete search history.

(56) References Cited

U.S. PATENT DOCUMENTS

| | | | | |
|---|---|---|---|---|
| 10,310,768 | B1* | 6/2019 | Gauria | ...................... G06T 1/20 |
| 10,409,887 | B1* | 9/2019 | Gauria | ................ G06F 12/0207 |
| 2012/0215825 | A1* | 8/2012 | Mavalankar | .......... G06F 7/5443 |
| | | | | 708/551 |
| 2013/0346463 | A1* | 12/2013 | Hilker | ..................... G06F 7/483 |
| | | | | 708/620 |

OTHER PUBLICATIONS

Y. Fu, et al, "Deep Learning with INT8 Optimization on Xilinx Devices," WP486 (v1.0.1) Apr. 24, 2017. [Online]. Available: https://www.xilinx.com/support/documentation/white_papers/wp486-deep-learning-int8.pdf.
Extended European Search Result for EP Application No. 18163736.4 dated Sep. 3, 2018.

(Continued)

*Primary Examiner* — Emily E Larocque
(74) *Attorney, Agent, or Firm* — Fletcher Yoder P.C.

(57) ABSTRACT

Systems and methods are related to improving throughput of neural networks in integrated circuits by combining values in operands to increase compute density. A system includes an integrated circuit (IC) having multiplier circuitry. The IC receives a first value and a second value in a first operand. The IC performs a multiplication operation, via the multiplier circuitry, on the first operand and a second operand to produce a first multiplied product based at least in part on the first value and a second multiplied product based at least in part on the second value.

20 Claims, 6 Drawing Sheets

(56) References Cited

OTHER PUBLICATIONS

Yao Fu et al., "Embedded Vision with INT8 Optimization on Xilinix Devices", Apr. 19, 2017, XP055501333, retrieved from https://www.xilinx.com/support/documentation/white_papers/wp490-embedded-vision-int8.pdf on Aug. 22, 2018.
Nurvitadhi Eriko et al., "Accelerating Binarized Neural Networks: Comparison of FPGA, CPU, GPU, and ASIC", 2016 International Conference on Field-Programmable Technology (FPT), IEEE, Dec. 7, 2016, XP033098828, DOI: 10.1109/FPT.2016.7929192, retrieved on May 15, 2017.
Ug579, "UltraScale Architecture DSP Slice Advance Specification User Guide", Jul. 15, 2014, XP055501401, Retrieved from http://citeseerx.ist.psu.ed/viewdoc/download?doi_10.1.433.3568&rep=rep1&type=pdf.

\* cited by examiner

US 11,416,736 B2

DENSE DIGITAL ARITHMETIC CIRCUITRY UTILIZATION FOR FIXED-POINT MACHINE LEARNING

CROSS REFERENCE TO RELATED APPLICATIONS

This application is a Non-Provisional application claiming priority to U.S. Provisional Patent Application No. 62/488,636, entitled "Lower Precision Neural Network Systems and Methods," filed Apr. 21, 2017, the entirety of which is incorporated by reference for all purposes.

BACKGROUND

The present disclosure relates generally to efficient utilization of arithmetic circuitry of an integrated circuit, such as multiply-accumulate circuitry and/or digital signal processor (DSP) circuitry, for machine learning.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits, such as field programmable gate arrays (FPGAs), may include circuitry to perform various mathematical operations. For example, a deep learning neural network may be implemented in one or more integrated circuit devices for machine learning applications. The integrated circuit devices may perform several operations to output results for the neural network. However, in some instances, throughput of mathematical operations in neural networks may be limited by the hardware of the integrated circuit. Because of these limitations, the neural network may perform at a rate slower than desired.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
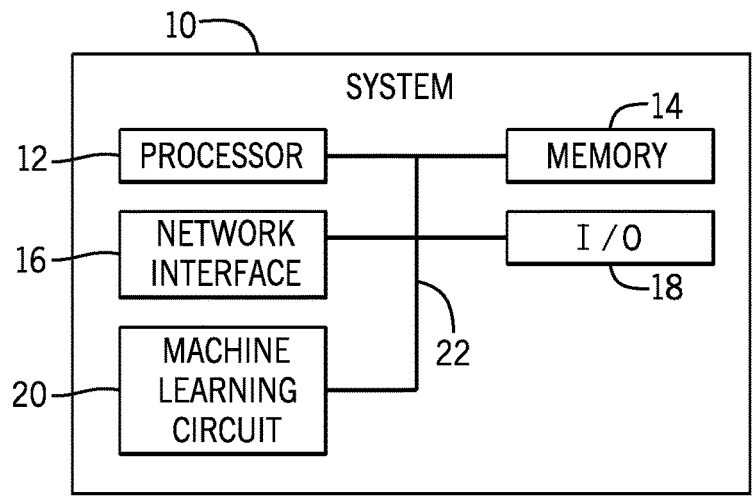
FIG. 1 is a block diagram of a data processing system that performs machine learning via a machine learning circuit, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Machine learning is used in a variety of settings to perform tasks through the use of examples. For example, neural networks may be used to perform a task without task-specific programming. That is, neural networks may be trained from prior data to classify or infer information from current data. For instance, training data may be used to identify images that contain an object by analyzing other images that include and do not include the object. While images are used as an example, this is simply meant to be illustrative and any suitable neural network task may be performed in the embodiments described below.

Configurable devices, such as programmable logic devices (PLDs), may perform one or more operations to execute tasks via machine learning. For example, integrated circuits (ICs), such as field programmable gate arrays (FPGAs), may include one or more digital signal processing (DSP) blocks, or DSP circuits, having one or more specialized processing blocks to perform arithmetic operations on data received by the DSP block. One type of specialized processing blocks in the DSP block may be multiply-accumulate (MAC) blocks, or MAC circuits, that include one or more multiplier circuits and/or one or more accumulator circuits. For instance, in some FPGAs, the MAC blocks may be hardened intellectual property (IP) blocks having specialized multiply circuitry coupled to specialized adder circuitry. Examples of operations performed by the MAC blocks include dot products, vector multiplications, and the like. As described below, the one or more multipliers of the DSP blocks may be used to perform neural network arithmetic operations during the classification or inference stage. However, throughput of the digital signal processor (DSP) may be limited by hardware of the IC. For example, the number of MAC blocks may limit the performance (e.g., speed) of the IC in performing arithmetic operations of the neural network.

Some arithmetic operations in neural networks may not involve the same precision as the precision designed to be processed in the MAC blocks. For example, the MAC block may include circuitry that processes 18 bit operands, but the neural network may involve multiplying lower precision 6 bit operands. The systems and methods described below improve neural network performances in ICs by better utilizing capacity of operands in multiply operations. By combining more than one quantity into each operand of multiply operations, speed of performing MAC operations (e.g., weightings and summations) by MAC blocks of ICs in the neural network applications may be improved. For example, two or more quantities may be packed into a first operand that is received by multiplier circuitry. Two or more quantities may be packed into a second operand received by the multiplier circuitry. The multiplier circuitry may then perform the multiplication operation between the first operand and the second operand to determine a product between each of the respective quantities. The multiplier circuitry may then output each of the products to be accumulated. To prevent overflow from the multiplication, a gap may be included between each of the quantities combined in the operands.

Further, to reduce likelihood of overflow from the accumulation, accumulator circuitry of the MAC block may be bypassed to a soft logic accumulator. That is, the multiplication of the MAC operation may be performed in a hardened multiplier that is specialized at performing multiplications and accumulations, and the accumulation of the MAC operation may be performed in soft logic to prevent overflow due to accumulating several products output from the multiplication.

With the foregoing in mind, FIG. 1 illustrates a block diagram of a data processing system 10 that may be used to perform one or more tasks via machine learning. The data processing system 10 may include a processor 10 operatively coupled to a memory 14. The processor 10 may execute one or more instructions stored on the memory 14 to perform the one or more tasks. The data processing system 10 may include a network interface 16 to send and/or receive data via a network to communicate with other electronic devices. The data processing system 10 may include one or more inputs/outputs (I/O) 18 that may be used to receive data via I/O devices, such as a keyboard, mouse, display, buttons, or other controls. The data processing system 10 may include a machine learning circuit 20 that performs one or more tasks using machine learning methods and techniques. The machine learning circuit 20 may include a PLD, such as an FPGA. Each of the processor 12, the memory 14, the network interface 16, the I/O 18, and the machine learning circuit 20 may be communicatively coupled to one another via interconnection circuitry 22, such as a communication bus.

Figure 2:
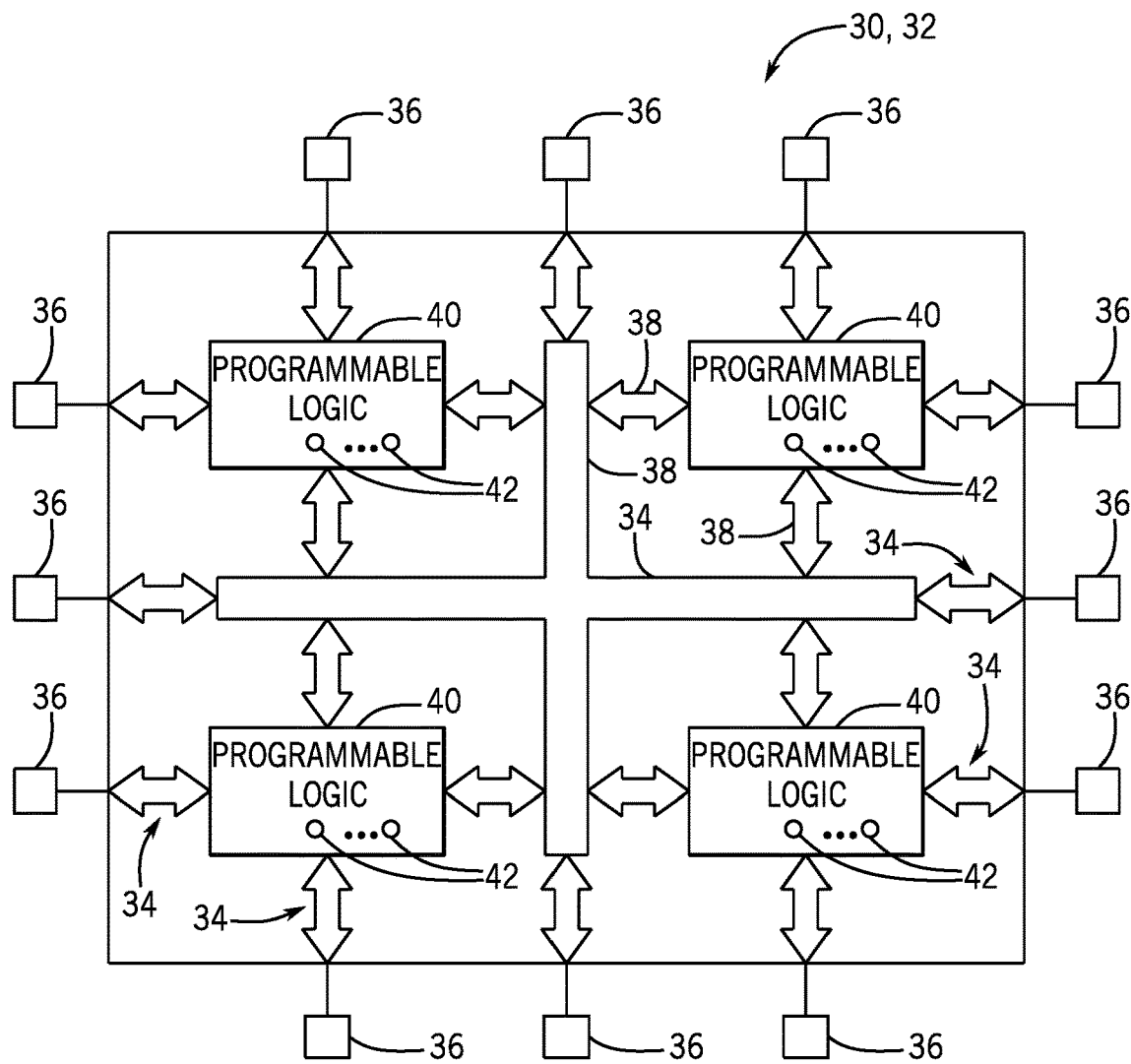
FIG. 2 is a block diagram of the machine learning circuit of FIG. 1, in accordance with an embodiment.

The hardware of the machine learning circuit 20 may perform one or more tasks using neural networks 100 and 138. Turning now to a more detailed discussion of an example of the machine learning circuit 20, FIG. 2 illustrates an IC 30, which may be a programmable logic device, such as a field-programmable gate array (FPGA) 32. For the purposes of this example, the device is referred to as an IC 30, though it should be understood that the device may be any suitable type of device (e.g., application-specific standard product) may be used. As shown, IC 30 may have input/output circuitry 34 for driving signals off IC 30 and for receiving signals from other devices via input/output pins 36. Interconnection resources 38, such as global and local vertical and horizontal conductive lines and buses, may be used to route signals on IC 30. Additionally, interconnection resources 38 may include fixed interconnects (conductive lines) and programmable interconnects (i.e., programmable connections between respective fixed interconnects). Programmable logic 40 may include combinational and sequential logic circuitry. For example, programmable logic 40 may include look-up tables, registers, and multiplexers. In various embodiments, the programmable logic 40 may be configured to perform a custom logic function. The programmable interconnects associated with interconnection resources may be considered to be a part of programmable logic 40. The IC 30 may include programmable elements 42 with the programmable logic 40. The programmable elements 42 may be based on any suitable programmable technology, such as fuses, antifuses, electrically-programmable read-only-memory technology, random-access memory cells, mask-programmed elements, and so forth.

The circuitry of IC 30 may be organized using any suitable architecture. As an example, the logic of IC 30 may be organized in a series of rows and columns of larger programmable logic regions, each of which may have multiple smaller logic regions. The logic resources of IC 30 may be interconnected by interconnection resources 38 such as associated vertical and horizontal conductors. For example, in some embodiments, these conductors may include global conductive lines that span substantially all of IC 30, fractional lines such as half-lines or quarter lines that span part of IC 30, staggered lines of a particular length (e.g., sufficient to interconnect several logic areas), smaller local lines, or any other suitable interconnection resource arrangement. Moreover, in further embodiments, the logic of IC 30 may be arranged in more levels or layers in which multiple large regions are interconnected to form still larger portions of logic. Still further, other device arrangements may use logic that is not arranged in a manner other than rows and columns. As explained below, the machine learning circuit 20 may perform the one or more tasks using hardware of the IC 30. For example, the machine learning circuit 20 may utilize arithmetic logic circuitry to perform arithmetic operations used in machine learning methods and techniques.

Figure 3:
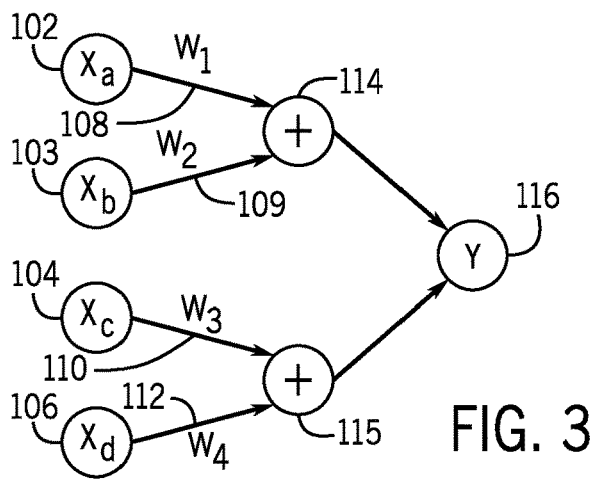
FIG. 3 is a network diagram of a neural network used to perform a task via the machine learning circuit of FIG. 1, in accordance with an embodiment.

FIG. 3 is a network diagram of an example of a machine learning network, such as a neural network 100, which may be utilized to perform one or more tasks on the machine learning circuit 20. While the neural network 100 is described in detail as an example, any suitable machine learning methods and techniques may be used. The neural network 100 includes a set of inputs 102, 103, 104, and 106, a set of weights 108, 109, 110, and 112, a set of summations 114 and 115, and a resultant value 116. Each of the inputs 102, 103, 104, and 106 is weighted with a respective weight to determine a respective weighted value 108, 109, 110, and 112. The weighted values 108 and 109 may be summed at the summation 114, and the weighted values 110 and 112 may be summed at the summation 115. The resultant value 116 may be output from the summations 114 and 115 and used to perform one or more tasks from prior data. While four inputs and two summations are shown, this is meant to be illustrative and any suitable combination of inputs, weightings, summations, and connections therebetween may be used.

Figure 4:
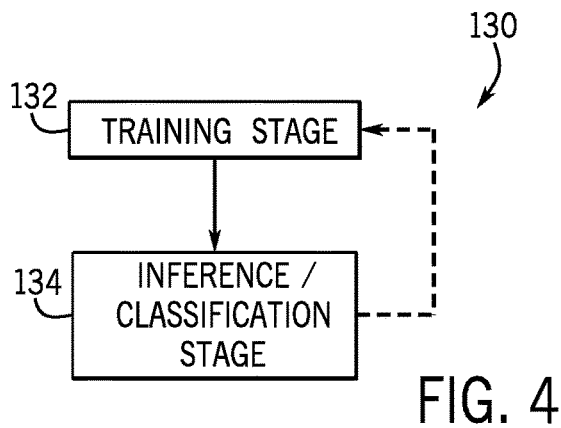
FIG. 4 is a flow diagram of a process performed by the machine learning circuit of FIG. 1, in accordance with an embodiment.

FIG. 4 is a flow diagram of a process 130 that may be performed in conjunction with the neural network 100 on the IC 30. At block 132, the IC 30 may perform training in which the weighted values 108, 109, 110, and 112 are determined and/or adjusted such that the weights applied to the inputs 102, 103, 104, and 106 indicate a likelihood that the respective inputs 102, 103, 104, and 106 predict the resultant value 116.

Upon training the neural network 100, at block 134, the IC 30 may perform inferences and/or classifications on new data. In an example involving image recognition, for example, the neural network 100 may be trained using images of shapes (e.g., circles, triangles, squares) in which the shape in the image is known. Then, the IC 30 may classify the shapes of new data using the neural network 100 after the weights have been adjusted from the training data. By adjusting the weights applied to the inputs 102, 103, 104, and 106 based on the training data, weights may be obtained that, when applied to new images, reflect a likelihood that the respective input of the new image includes a certain shape. In some embodiments, continued learning may occur in which new data is then verified and the weights are continually adjusted. Each of the blocks 134 may be performed via the machine learning circuit 20 and/or some operations of each of the blocks 134 may be performed via the processor 12.

Figure 5:
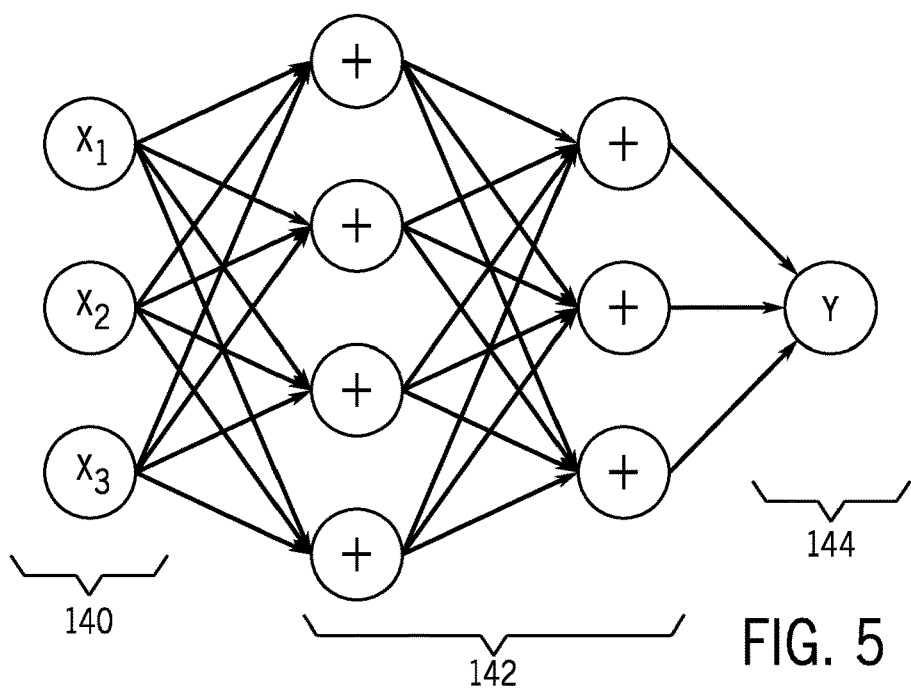
FIG. 5 is diagram of another neural network used to perform a task via the machine learning circuit of FIG. 1, in accordance with an embodiment.

FIG. 5 is a network diagram of an example of a neural network 138 having an input layer 140, more than one computational layers 142, and an output layer 144. The illustrated embodiment may be referred to as a deep neural network due to having more than one computational layers 142, also referred to as hidden layers. As the number of computational layers 142 increases, the complexity and processing of inputs increases. In the illustrated embodiment, each input is weighted and summed at four summations, and each respective summation is then weighted and summed at three summations, which are then used to output a resultant value.

As explained below the circuitry of the IC 30 may further include one or more DSP blocks. The DSP block may include one or more (multiply-accumulate) MAC blocks, or MAC circuits. Each MAC block may include hardened circuitry (e.g., multiplier circuitry and accumulator circuitry) that is designed and specialized to perform multiplication and accumulation operations. While the MAC block may include circuitry that performs multiplication and accumulation of inputs having a certain amount of precision, the neural network 100 may have inputs 102, 103, 104, and 106 and weights of lower precision than the circuitry of the MAC block. For example, while the neural network 100 may utilize weights and inputs 102, 103, 104, and 106 of six-bit precision, the MAC block may include circuitry designed to process eighteen-bit inputs. By combining more than one value from the neural network 100 into the same operand of the MAC block, each multiplication of the MAC block may process additional values associated with the neural network 100 to improve throughput of the neural network 100.

Figure 6:
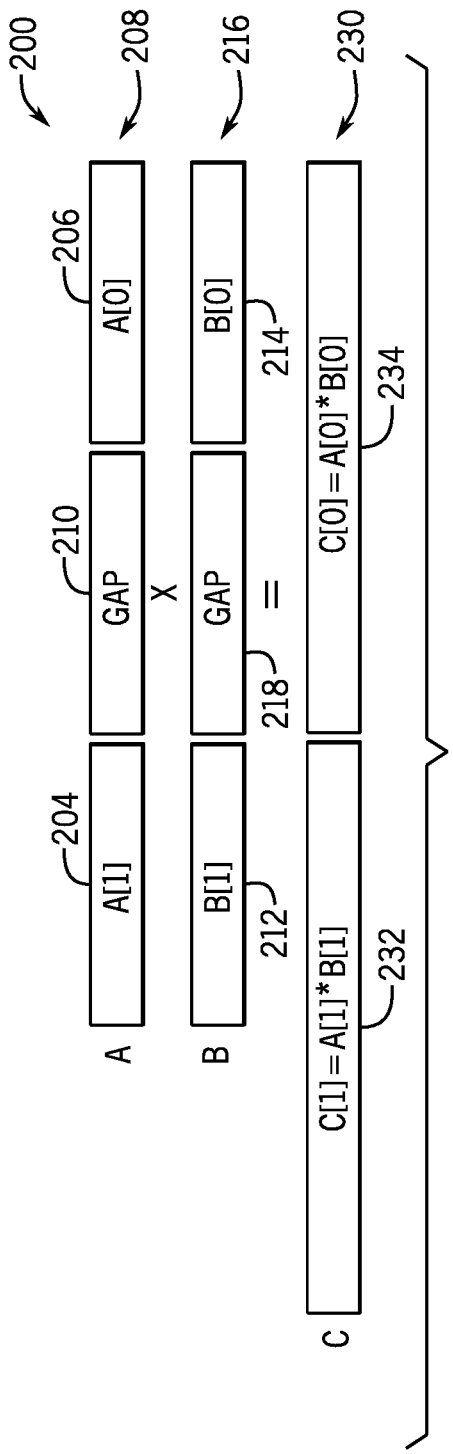
FIG. 6 is a block diagram of a data structure for multiplication operations performed via the machine learning circuit of FIG. 1, in accordance with an embodiment.

FIG. 6 is an example of a set of data structures 200 of the IC 30 having combined values in the same operand to allow the IC 30 to process values of the neural network 100 at a faster rate. The IC 30 may combine a first value 204 and a second value 206 into a first operand 208. That is, the IC 30 may pack each bit of the first value 204 and each bit of the second value 206 into the first operand 208. For example, a first component (e.g., first set of bits) of the first operand 208 may represent a first value 204 and a second component (e.g., second set of bits) of the first operand 208 may represent a second value 206. Further, the operand 208 may include a gap between the first value 204 and the second value 206 to prevent overflow. For example, the gap 210 may be at least the number of bits of the first value 204 or the second value 206. The first value 204 may be the first input 102 and the second value 206 may be the second input 104.

Similarly, the IC 30 may combine a third value 212 and a fourth value 214 into a second operand 216. The second operand 216 may include a gap 218 between the third value 212 and the fourth value 214 to prevent overflow. The gap 218 may be at least the number of bits of the third value 212 or the fourth value 214. In the example described above in which the neural network 100 utilizes six-bit precision, the first value 204, the second value 206, the third value 212, the fourth value 214, and the gaps 210 and 218 may each be six bits. The third value 212 may be a first weight to be applied to the first input 102 and the fourth value 106 may be a second weight applied to the second input 104.

The IC 30 may perform a multiplication operation on the first operand 208 and the second operand 216 such that a multiplied product 230 includes a first product 232 of the first value 204 multiplied with the third value 212 and a second product 234, from the same multiplication operation, of the second value 206 multiplied with the fourth value 214. That is, by combining or packing more than one value into each operand 208 and 216 with sufficient gap 210 and 218 between the values, the multiplied product 230 may include each respective product without overflow. For example, in the neural network 100, the first product 232 may be the weighted value 108 from the first weight applied to the first input 102 and the second product 234 may be the second weighted value 110 from the second weight applied to the second input 104. By combining the values from the neural network 100 into each operand 208 and 216, the resultant value 116 may be determined at a faster rate due to increased throughput.

Each of the first product 232 and the second product 234 may subsequently be split from the multiplied product 230 and accumulated. Because the accumulation may be a faster operation than the multiplication, the performance of the neural network 100 may be improved by determining more than one product from a single multiplication operation using more of the available precision in the hardened multiplier circuitry of the IC 30. Further, the hardened circuitry of MAC blocks in the IC 30 may be specialized to perform the multiplications to determine the weighted values 108, 109, 110, and 112 at a faster rate than in circuitry that executes multiplications in soft logic due to the specialization of the hardened circuitry.

Figure 7:
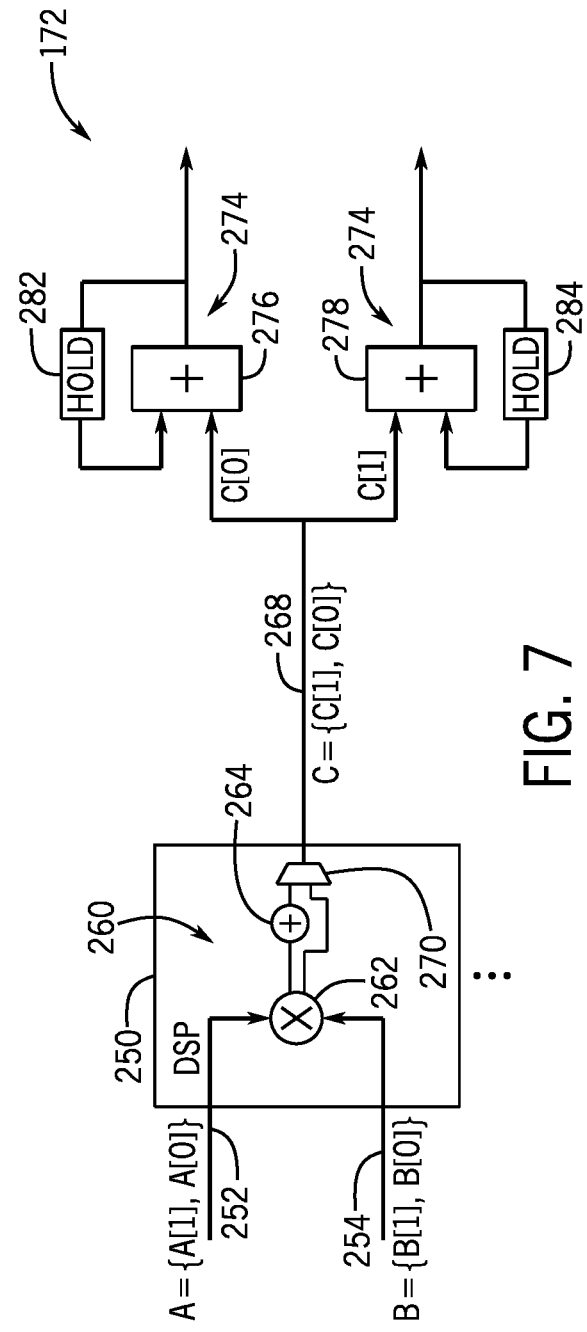
FIG. 7 is a block diagram of the machine learning circuit of FIG. 1 used to perform multiplication operations, in accordance with an embodiment.

FIG. 7 is a block diagram of circuitry of the IC 30 that performs the arithmetic operations described with respect to FIG. 6. The IC 30 may include a DSP block 250 having first input circuitry 252 and second input circuitry 254 to receive a first operand 208 and a second operand 216 respectively. The DSP block 250 may include a MAC block 260 having multiplier circuitry 262 that multiplies the first operand 208 with the second operand 216 and outputs a product. That is, the multiplier circuitry 262 may be designed or hardened with circuitry to perform multiplication operations on operands of a certain precision. By including more than one value of lower precision than the designed operand precision into the operand prior to executing the multiplication operation, more than one product may be determined from the multiplication operation.

In some embodiments, the MAC block 260 may include adder circuitry 264 that may add the products from the multiplier circuitry 262. Upon completing the MAC operation, the MAC block 260 may output a result via the output circuitry 268. In the illustrated embodiment, the IC 30 may include more than one DSP block 250 (e.g., 2, 3, 4, 5, or more), and each DSP block may include more than one MAC block 252 (e.g. 2, 3, 4, 5, 10, 20, 50, or more).

The MAC block 252 may include bypass circuitry 270 (e.g., multiplexor) to bypass the adder 264 and to provide the multiplied product 230 to soft logic 274 of the IC 30. Further, the IC 30 may then perform the summations 114 and 115 of the neural network in the soft logic 274 of the IC 30. The soft logic 274 may refer to programmed instructions (e.g., code) stored in memory on the IC 30 to execute operations of the IC 30. The IC 30 may be programmed to execute instructions to split the first product 232 and the second product 234 from the multiplied product 230. The IC 30 may then execute instructions to accumulate 276 the first product (e.g., first weighted value 108) with one or more other products (e.g., weighted value 109) to determine a total from the summation 114. The IC 30 may execute instructions to accumulate 278 the second product (e.g., weighted value 110) with one or more other products (e.g., weighted value 112). For example, the first product (e.g., weighted value 108) may be held at block 282. The IC 30 may then perform another multiplication to determine third and fourth products (e.g., the weighted values 109 and 112) by combining the fifth and sixth values (e.g., inputs 103 and 106) into a third operand and seventh and eighth values (e.g., the weights for the respective inputs) into a fourth operand. The third and fourth products (e.g., weighted values 109 and 112) may then be added to each respective total being held 282 and 284. By implementing the accumulators in soft logic 274, more accumulation operations may be performed with less or no risk of overflow. By moving to lower precision neural networks than the six bit example, the IC 30 may obtain additional products in each multiplication operation.

Figure 8:
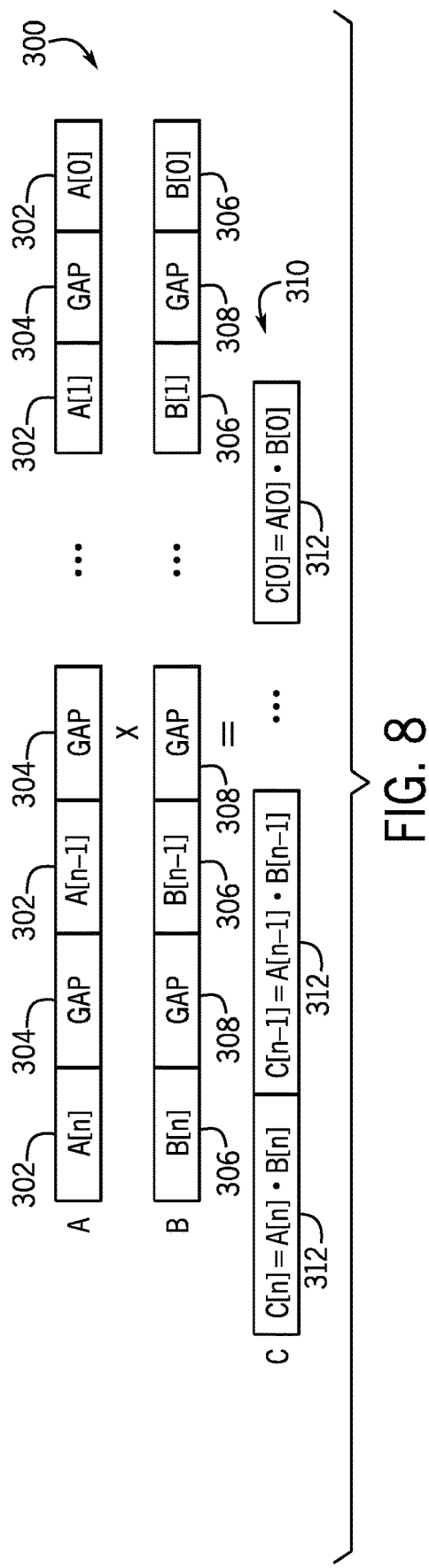
FIG. 8 is a block diagram of a generalized data structure for multiplication operations performed via the machine learning circuit of FIG. 1, in accordance with an embodiment.

FIG. 8 is a more generalized example of a data structure 300 used in performing multiplication operations in the neural network 100 on the IC 30. The IC 30 may combine values A[0] to A[n] into a first operand. Similarly, the IC 30 may combine values B[0] to B[n] into a second operand. Each of the values 302 and 306 may be separated from other values 302 and 306 by gaps 304 and 308 to prevent overflow.

Upon performing the multiplication operation, the multiplied product 310 may include a set of multiplied values 312 C[0] to C[n] from multiplying each respective value of A to B. Lower precision levels of the neural network may allow for additional values to be included in each multiplication operation. For example in an eighteen bit multiplication operation the following table may reflect precision levels with respect to the number of values in each operand:

| Precision (bits) | Compute Improvement (Low-precision - 18-bits) |
|---|---|
| 1 | 9x |
| 2 | 5x |
| 3 | 3x |
| 4 | 2x |
| 5 | 2x |
| 6 | 2x |

This relationship may be more generalized according to the following equation:

$$num_{comp} = \text{floor}\left(\frac{Width_{Mult}}{2*\text{precision}} + 0.5\right)$$

Where $num_{comp}$ refers to the number of values that may be included in each operand, $Width_{Mult}$ refers to the number of bits in each operand, and precision refers to the number of bits used in operations in the neural network 100.

Figure 9:
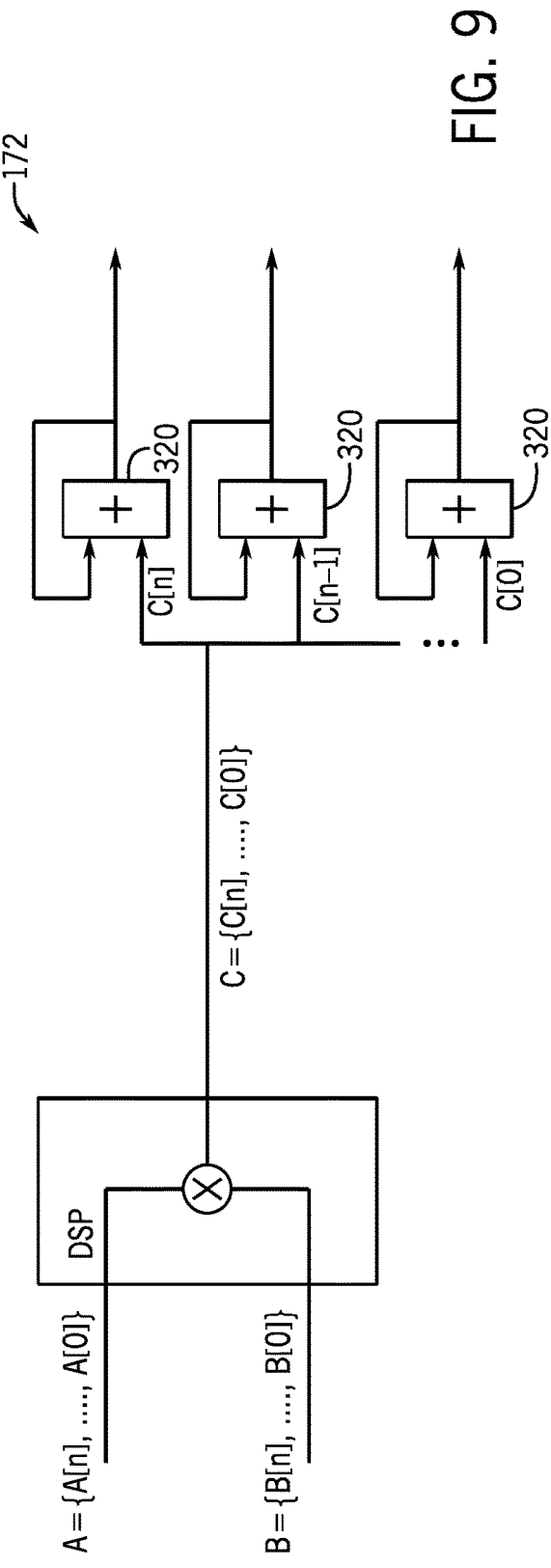
FIG. 9 is a block diagram of the machine learning circuit of FIG. 1 used to perform generalized multiplication operations, in accordance with an embodiment.

FIG. 9 is a generalized block diagram of circuitry of the IC 30 that performs arithmetic operations for the neural network of FIG. 3 using the data structure of FIG. 8. The IC 30 includes similar circuitry to the circuitry described with respect to FIG. 7. Further, additional accumulators (e.g., in code) may be used for each of the values 312 in the multiplied product 310.

Figure 10:
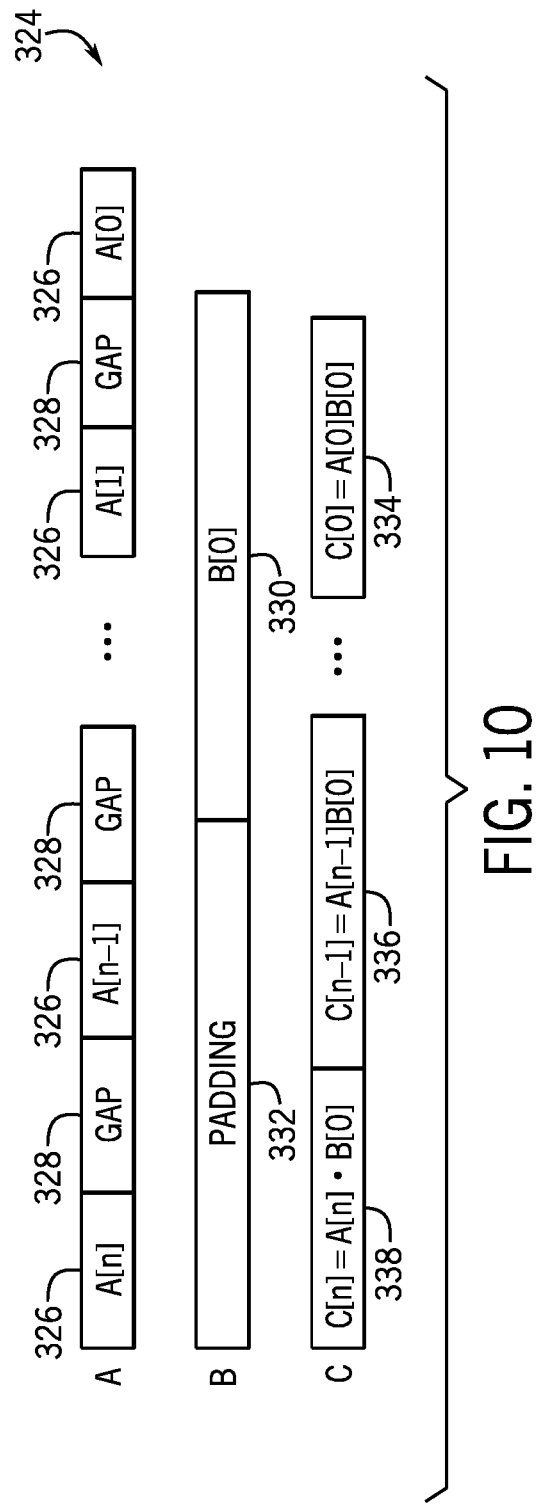
FIG. 10 is a block diagram of another data structure for multiplication operations performed via the machine learning circuit of FIG. 1, in accordance with an embodiment.

FIG. 10 is a block diagram of another data structure 324 that may be used in conjunction with the circuitry described with respect to FIG. 9. The data structure 324 includes a first operand having N values 326 A[0] to A[n] with gaps 328 between each of the values 326. The data structure 324 includes a second operand having a single value B[0] 330 and padding 332 throughout the remainder of the first operand. The single value B[0] may be the same precision as each of the N values of the first operand. Upon performing the multiplication operation, the IC 30 may determine a first multiplied product 334 by multiplying a first value A[0] of the first operand with B[0] 330. The IC 30 may determine a second multiplied product 334 by multiplying a second value A[1] of the first operand with B[0] 330. That is, B[0] 330 may be multiplied with each of the N values 326 of the first operand.

Figure 11:
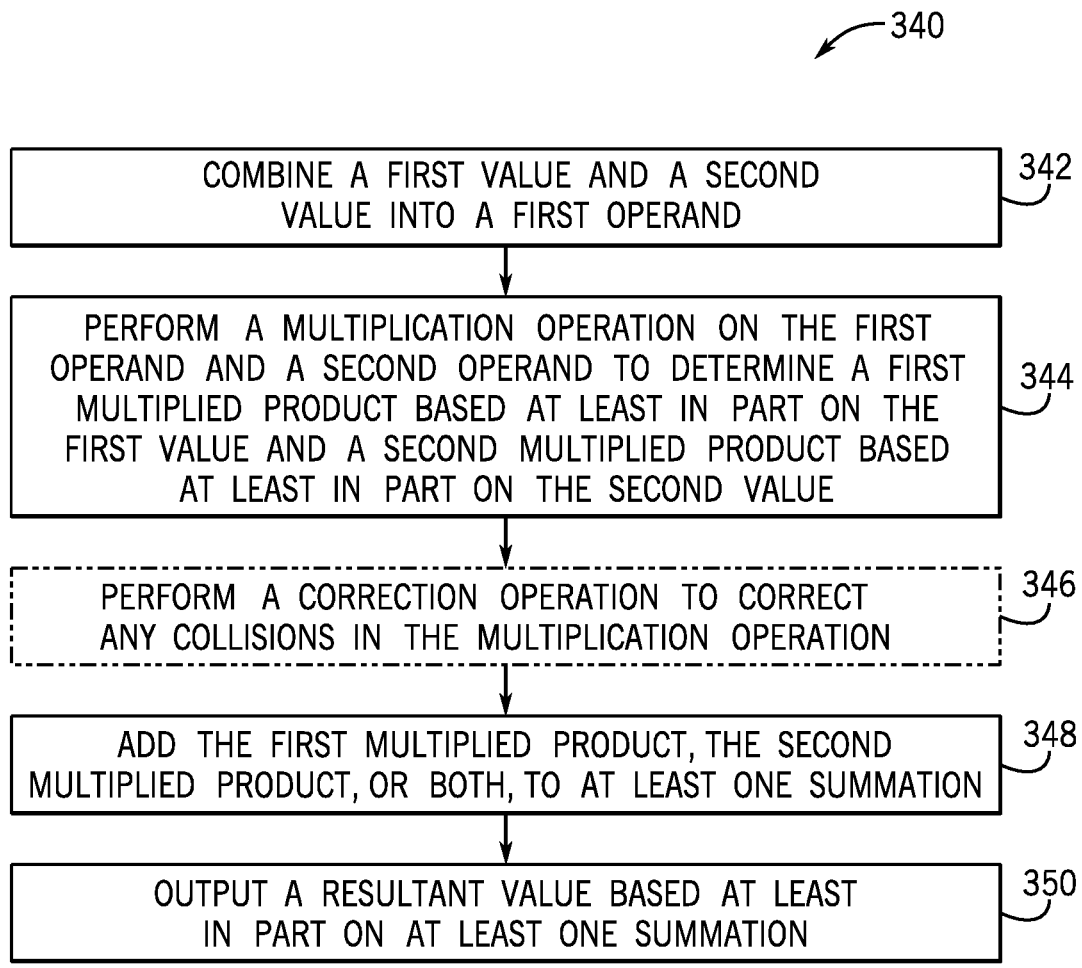
FIG. 11 is a flow diagram of a process performed by the machine learning circuit of FIG. 1 to perform multiplication operations for neural networks, in accordance with an embodiment.

FIG. 11 is a flow diagram of a process 340 performed by the IC 30 to perform the arithmetic operations of the neural network 100 to output a resultant value 116 described in conjunction with the example of FIGS. 5 and 6. At block 342, the IC 30 may combine (e.g., pack) a first value and a second value into a first operand. In some embodiments, the IC 30 may combine (e.g., pack) a third value and a fourth value into a second operand. As mentioned above with respect to FIGS. 8 and 9, additional values may be included in each of the first operand and the second operand. Further, in certain embodiments described with respect to FIG. 10, the IC 30 may simply have a single value in the second operand. At block 344, the IC 30 may multiply the first operand with the second operand to determine a first multiplied product based at least in part on the first value and a second multiplied product based at least in part on the second value. In the example in which the second operand includes a third value and a fourth value, for instance, the first multiplied product may be the first value multiplied by the third value and the second multiplied product may be the second value multiplied by the fourth value. In this manner, more than one multiplied products may be determined from the same multiplication operation performed by the hardened multiplier circuitry. In some embodiments, the multiplication operation may be performed in the hardened multiplier circuitry and the multiplied result having both the first multiplied product and the second multiplied product may be output to soft logic where the first multiplied product and the second multiplied product may be split from one another.

In some embodiments, at block 346, the IC 30 may perform a correction operation (e.g., in the soft logic) to correct any collisions in the multiplication operation. For example, if the first multiplied product overlaps with the second multiplied product due to overflow, the IC 30 may perform an exclusive OR (XOR) operation, a masking operation, or the like, to correct for the overlapped values. At block 348, the IC 30 may then add the first multiplied product, the second multiplied product, or both, to at least one summation. For example, the first multiplied product and the second multiplied product may be added to the same summation 114, or each product may be added to different summations 114 and 115 respectively. At block 350, the IC 30 may output a resultant value based at least in part on the at least one summation. That is, the resultant value may be from a total of two summations 114 and 115, as in FIG. 3, or the resultant value may be determined after several computational layers, as in FIG. 5. The resultant value 116 may be output (e.g., via I/O pins 36) to control an operation of the IC 30. In some embodiments, the resultant value 116 may be displayed to a user. In other embodiments, the resultant value 116 may be sent to another electronic device. By combining lower precision values into operands having a designed precision greater than the lower precision values, throughput through the neural network may be improved.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An integrated circuit device comprising:
   programmable logic circuitry;
   multiplier circuitry; and
   first input circuitry to the multiplier circuitry, wherein the first input circuitry is configurable to receive a first operand, wherein a first component of the first operand comprises a first value, a second component of the first operand comprises a second value, and a third component of the first operand comprises a third value; and
   second input circuitry to the multiplier circuitry, wherein the second input circuitry is configurable to receive a second operand, wherein a first component of the second operand comprises a fourth value, a second component of the second operand comprises a fifth value, and a third component of the second operand comprises a sixth value, wherein the multiplier circuitry is configurable to multiply components of the first operand and the second operand to produce a plurality of results corresponding to a plurality of distinct multiply operations, wherein the plurality of results comprises:
      a first result of the plurality of results, wherein the first result is a product of a first multiply operation based on the first value and the fourth value;
      a second result of the plurality of results, wherein the second result is a product of a second multiply operation based on the second value and the fifth value; and
      a third result of the plurality of results, wherein the third result is a product of a third multiply operation based on the third value and the sixth value.

2. The integrated circuit device of claim 1, wherein the integrated circuit device further comprises accumulator circuitry, wherein the accumulator circuitry is configurable to perform an accumulation of the plurality of results.

3. The integrated circuit device of claim 1, wherein the integrated circuit device comprises digital processing circuitry comprising the multiplier circuitry, the first input circuitry, and the second input circuitry.

4. The integrated circuit device of claim 1, wherein the integrated circuit device further comprises adder circuitry.

5. The integrated circuit device of claim 4, wherein the adder circuitry is configurable to receive one or more inputs comprising at least the first result, the second result, and the third result.

6. The integrated circuit device of claim 1, wherein the first value, the second value, and the third value each have a precision of at least 6 bits and less than 18 bits.

7. The integrated circuit device of claim 1, wherein the integrated circuit device is configurable to perform arithmetic operations in a mode optimized for neural networking processing.

8. The integrated circuit device of claim 1, wherein the first component and the second component are from the programmable logic circuitry.

9. The integrated circuit device of claim 1, wherein a data processing system comprises the integrated circuit device.

10. The integrated circuit device of claim 9, wherein the data processing system further comprises:
    a processor;
    a memory coupled to the processor; and a network interface coupled to the memory and the processor, wherein the network interface is communicatively coupled to a programmable logic device outside of the integrated circuit device.

11. A method comprising:
    receiving, via a first input circuitry, a first component of a first operand that comprises a first value, a second component of the first operand that comprises a second value, and a third component of the first operand that comprises a third value;
    receiving, via a second input circuitry, a first component of a second operand that comprises a fourth value, a second component of the second operand that comprises a fifth value, and a third component of the second operand comprises a sixth value;
    multiplying the first operand and the second operand to produce a plurality of results corresponding to a plurality of distinct multiply operations, wherein the plurality of results comprises:
       a first result of the plurality of results, wherein the first result is equivalent to a product of a first multiply operation based on the first value and the fourth value;
       a second result of the plurality of results, wherein the second result is a product of a second multiply operation based on the second value and the fifth value; and
       a third result of the plurality of results, wherein the third result is a product of a third multiply operation based on the third value and the sixth value.

12. The method of claim 11, wherein the first value, the second value, and the third value each have a precision of at least 6 bits and less than 18 bits.

13. The method of claim 11, wherein the first component and the second component are received from a programmable logic fabric.

14. The method of claim 13, comprising adding the first result, the second result and the third result in adder circuitry.

15. The method of claim 11, comprising performing arithmetic operations in a mode optimized for neural network processing.

16. A system, comprising an integrated circuit device, wherein the integrated circuit device comprises:
    programmable logic circuitry;
    multiplier circuitry;
    first input circuitry to the multiplier circuitry, wherein the first input circuitry is configurable to receive a first operand, wherein a first component of the first operand comprises a first value, a second component of the first operand comprises a second value, and a third component of the first operand comprises a third value; and second input circuitry to the multiplier circuitry, wherein the second input circuitry is configurable to receive a second operand, wherein a first component of the second operand comprises a fourth value, a second component of the second operand comprises a fifth value, and a third component of the second operand comprises a sixth value, wherein the multiplier circuitry is configurable to multiply the first operand and the second operand to produce a plurality of results corresponding to a plurality of distinct multiply operations, wherein the plurality of results comprises:

a first result of the plurality of results, wherein the first result is a product of a first multiply operation based on the first value and the fourth value;

a second result of the plurality of results, wherein the second result is a product of a second multiply operation based on the second value and the fifth value; and a third result of the plurality of results, wherein the third result is a product of a third multiply operation based on the third value and the sixth value.

17. The system of claim 16, wherein the programmable logic circuitry comprises a multiplexer.

18. The system of claim 16, wherein the integrated circuit device further comprises accumulator circuitry, wherein the accumulator circuitry is configurable to perform an accumulation of the plurality of results.

19. The system of claim 16, wherein the integrated circuit device comprises a digital processing block comprising the multiplier circuitry, the first input circuitry, and the second input circuitry.

20. The system of claim 16, wherein the integrated circuit device is configurable to perform arithmetic operations in a mode optimized for neural networking processing.

* * * * *